United States Patent
Peng et al.

(10) Patent No.: US 7,085,131 B2
(45) Date of Patent: Aug. 1, 2006

(54) FASTENING DEVICE FOR DATA STORAGE DEVICES

(75) Inventors: Wen-Tang Peng, Tu-Cheng (TW); Cheng-Lung Cheng, Tu-Cheng (TW); Jun-Xiong Zhang, Shenzhen (CN)

(73) Assignee: HON HAI Precision Industry Co., Ltd., Tu-cheng (TW)

( * ) Notice: Subject to any disclaimer, the term of this patent is extended or adjusted under 35 U.S.C. 154(b) by 40 days.

(21) Appl. No.: 10/872,907

(22) Filed: Jun. 21, 2004

(65) Prior Publication Data

US 2005/0190535 A1    Sep. 1, 2005

(30) Foreign Application Priority Data

Feb. 27, 2004    (CN) .................. 2004 2 0043054 U

(51) Int. Cl.
    *G06F 1/16* (2006.01)
(52) U.S. Cl. ................. 361/685; 312/223.1; 312/223.2
(58) Field of Classification Search ................. 361/685
    See application file for complete search history.

(56) References Cited

U.S. PATENT DOCUMENTS

| | | | |
|---|---|---|---|
| 5,227,954 A | 7/1993 | Twigg | |
| 5,510,955 A | 4/1996 | Taesang | |
| 6,215,074 B1 * | 4/2001 | Good et al. | 174/138 G |
| 6,304,457 B1 | 10/2001 | Liu et al. | |
| 6,373,695 B1 * | 4/2002 | Cheng | 361/685 |
| 6,661,677 B1 * | 12/2003 | Rumney | 361/818 |
| 2003/0090869 A1 * | 5/2003 | Liu et al. | 361/685 |
| 2004/0075978 A1 * | 4/2004 | Chen et al. | 361/685 |
| 2004/0095717 A1 * | 5/2004 | Hsu et al. | 361/685 |
| 2004/0179333 A1 * | 9/2004 | Xu | 361/685 |

* cited by examiner

*Primary Examiner*—Lynn Feild
*Assistant Examiner*—Anthony Q. Edwards
(74) *Attorney, Agent, or Firm*—Tim Tingkang Xia, Esq.; Morris, Manning & Martin

(57) ABSTRACT

A fastening device for securing a data storage device (10) includes a bracket (20), a rail (30) and a fixing plate (40). The rail is mounted to a side of the data storage device, and includes a post (34) protruding from a side thereof. The bracket includes a first sidewall (23) defining a receiving groove (234) in an end thereof. The fixing plate includes a first member (42) attached to the first sidewall. The first member defines a locking hole (424) corresponding to the receiving groove of the first sidewall. The locking hole and the receiving groove partly overlap, a receiving hole is thereby defined. When the post of the rail is engaged with the receiving hole, the data storage device is assembled in the bracket; when the post of the rail is disengaged from the receiving hole, the data storage device is disassembled from the bracket.

14 Claims, 6 Drawing Sheets

FASTENING DEVICE FOR DATA STORAGE DEVICES

BACKGROUND OF THE INVENTION

1. Field of the Invention

The present invention relates to fastening devices for data storage devices, and particularly to a fastening device that has a simple structure and readily attach data storage devices in a bracket.

2. Description of Prior Art

Various data storage devices are installed in a computer for communication and handling data. Conventionally, a computer data storage device is directly secured to a bracket of the computer using screws. Installation and removal of screws requires a tool. This is unduly complicated and laborious, and reduces the efficiency of assembly in mass production facilities.

A common way to overcome the above shortcomings is to have a pair of rails formed in opposite sidewalls of a bracket. Such rails are disclosed in U.S. Pat. Nos. 5,510,955, 6,034,457 and 5,227,954. Referring to FIG. 6, U.S. Pat. No. 5,510,955 discloses a fastening device with rails, the fastening device comprises a bracket 60, a pair of rails 62 and a pair of locking pins 64. In assembly, the rails 62 are respectively mounted to opposite sides of a data storage device 66 with two bolts 68. The data storage device 66 together with the rails 62 is attached to the bracket 60 with the locking pins 64. However, mounting the rails 62 to the data storage device 66 with bolts 68 is unduly complicated and time-consuming.

A new fastening device for data storage devices that overcomes the above-mentioned problems is desired.

SUMMARY OF THE INVENTION

An object of the present invention is to provide a fastening device which has a simple structure and can readily attach a data storage device within a bracket.

In order to achieve the above object, a fastening device in accordance with a preferred embodiment of the present invention comprises a bracket for installing a data storage device therein, a rail and a fixing plate. The rail is mounted to a side of the data storage device. The rail comprises a post protruding from a side thereof. The bracket comprising a first sidewall defining a receiving groove in an end thereof. The fixing plate comprises a first member and a second member. The first and second members are not coplanar. The first member is attached to the first sidewall of the bracket. The first member defines a locking hole in an end thereof, the locking hole corresponding to the receiving groove of the first sidewall. The locking hole of the fixing plate and the receiving groove of the bracket partly overlap, a receiving hole is thereby defined. When the post of the rail is engaged with the receiving hole, the data storage device is assembled in the bracket; when the post of the rail is disengaged from the receiving hole, the data storage device is disassembled from the bracket plate.

Other objects, advantages and novel features of the present invention will become more apparent from the following detailed description when taken in conjunction with the accompanying drawings, in which:

DESCRIPTION OF THE PREFERRED EMBODIMENT

Reference will now be made to the drawings to describe the present invention in detail.

Figure 1:
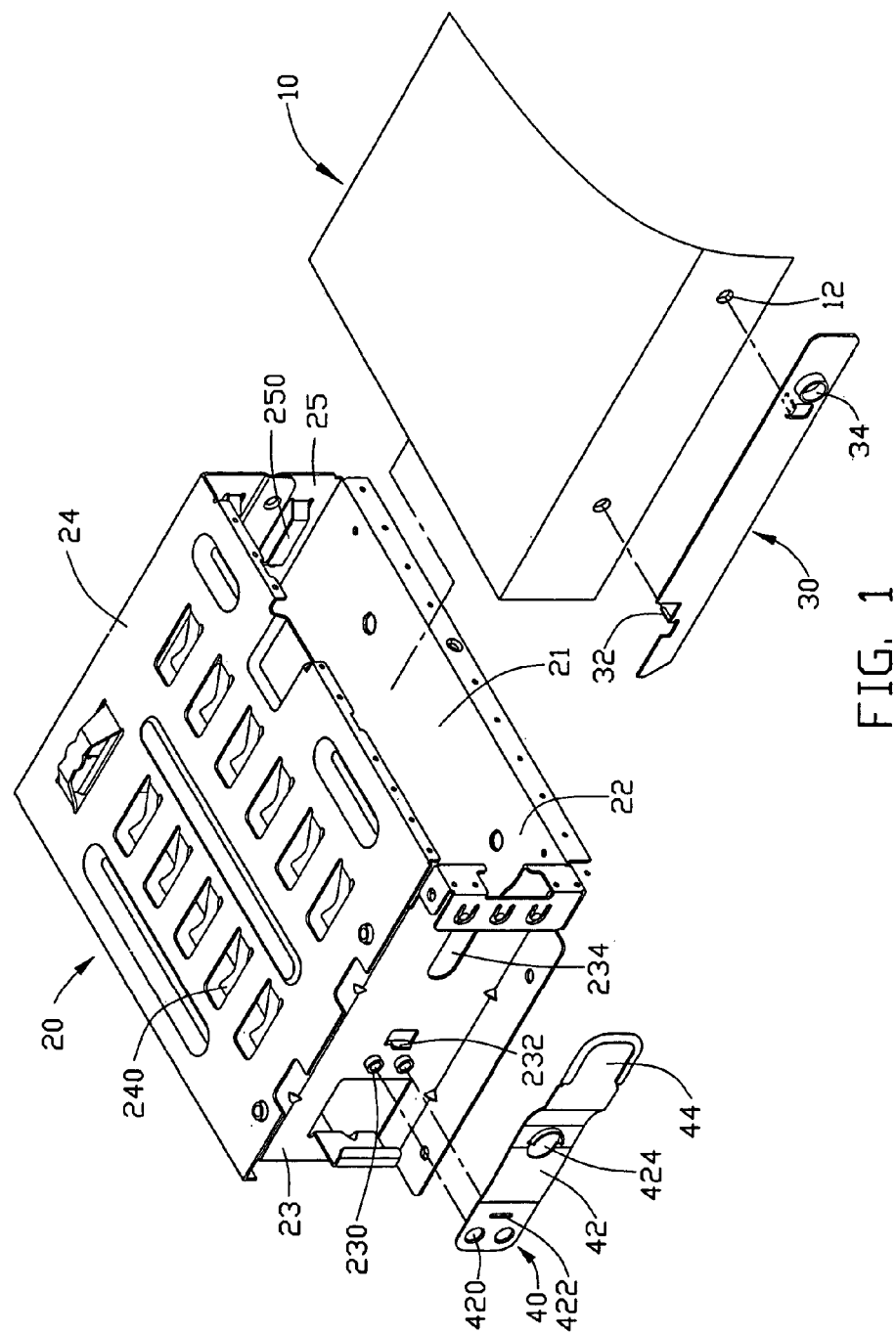
FIG. 1 is an exploded, isometric view of a fastening device in accordance with a preferred embodiment of the present invention, together with a data storage device.

FIG. 1 shows a fastening device of an electronic apparatus like a computer having data storage devices in accordance with the preferred embodiment of the present invention, together with a data storage device 10. The fastening device comprises a bracket 20, a rail 30 and a fixing plate-like part 40. A pair of holes 12 is defined in opposite sides of the data storage device 10 respectively.

The rail 30 is a generally rectangular plate. A pair of mounting pins 32 is stamped from a side of the rail 30. A hollow locking post 34 is stamped from the other side of the rail 30. The locking post 34 is adjacent to one of the mounting pins 32. The mounting pins 32 are respectively received in the holes 12 of the data storage device 10, the rail 30 is thus mounted to the data storage device 10.

The fixing plate 40 is a resilient plate. The fixing plate 40 comprises a first member 42 and a second member 44 extending from an end of the first member 42. The first and second members 42, 44 are not coplanar. The first member 42 defines a pair of circular mounting holes 420, a rectangular slot 422 and a locking hole 424. The locking hole 424 is adjacent to the second member 44. The slot 422 is located between the mounting holes 420 and the locking hole 424, and is adjacent to the mounting holes 420. The mounting holes 420 are apart from the second member 44.

The bracket 20 is attached to a computer case (not shown). The bracket 20 comprises a bottom wall 22, a first sidewall 23 extending upwardly from the bottom wall 22, a second sidewall 25 opposite to the first sidewall, and a top wall 24. The top wall 24 interconnects the first and second sidewalls 22, 25, and is parallel to the bottom wall 22. A receiving space 21 is bounded by the top wall 24, the bottom wall 22, the first sidewall 23 and the second sidewall 25. The data storage device 10 is received in the receiving space 21. A plurality of resilient tabs 250 is stamped from the second sidewall 25. A plurality of resilient tabs 240 is stamped from the top wall 24. The resilient tabs 240, 250 facilitate the data storage device 10 being stably mounted to the receiving space 21. A locating plate 232 is stamped from the first sidewall 23, corresponding to the locating slot 422 of the fixing plate 40. A pair of hollow mounting posts 230 is stamped from the first sidewall 23, corresponding to the mounting holes 420 of the fixing plate 40. A receiving groove 234 is defined in a front of the first sidewall 23, corresponding to the locking hole 424 of the fixing plate 40. The locating plate 232 is positioned between the mounting posts 230 and the receiving groove 234, and is adjacent to the mounting posts 230. The locating plate 232 is received in the slot 422 of the fixing plate 40, for preventing the fixing plate 40 from rotating when the fixing plate 40 is riveted to the first sidewall 23. An opening (not labeled) is formed in an extension (not labeled) from the first sidewall 23 beside the receiving space 21 so as to receive the second member 44 of the fixing plate 40 for extending therethrough.

Figure 2:
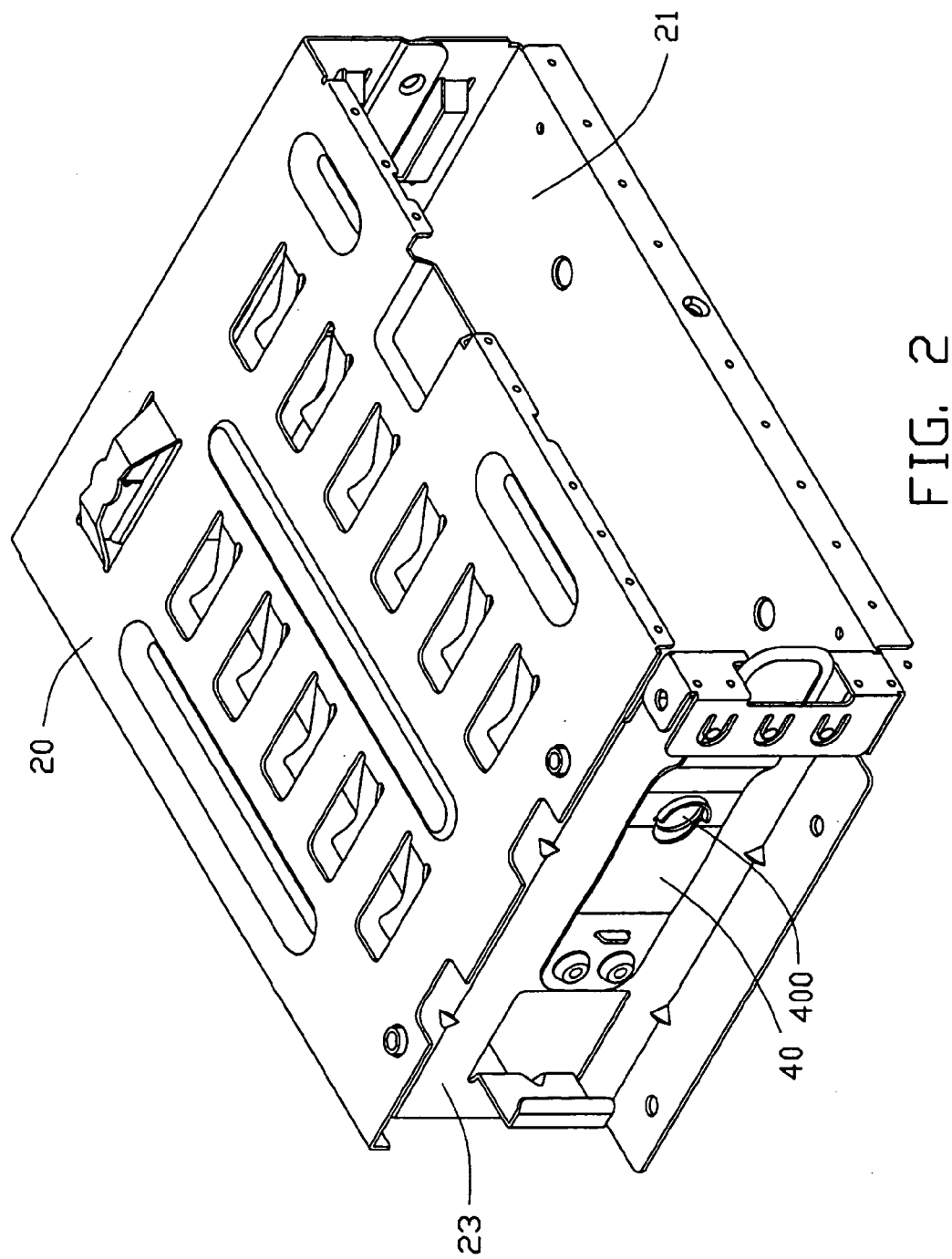
FIG. 2 is an enlarged, assembled view of a fixing plate and a bracket of the fastening device of FIG. 1.
Figure 3:
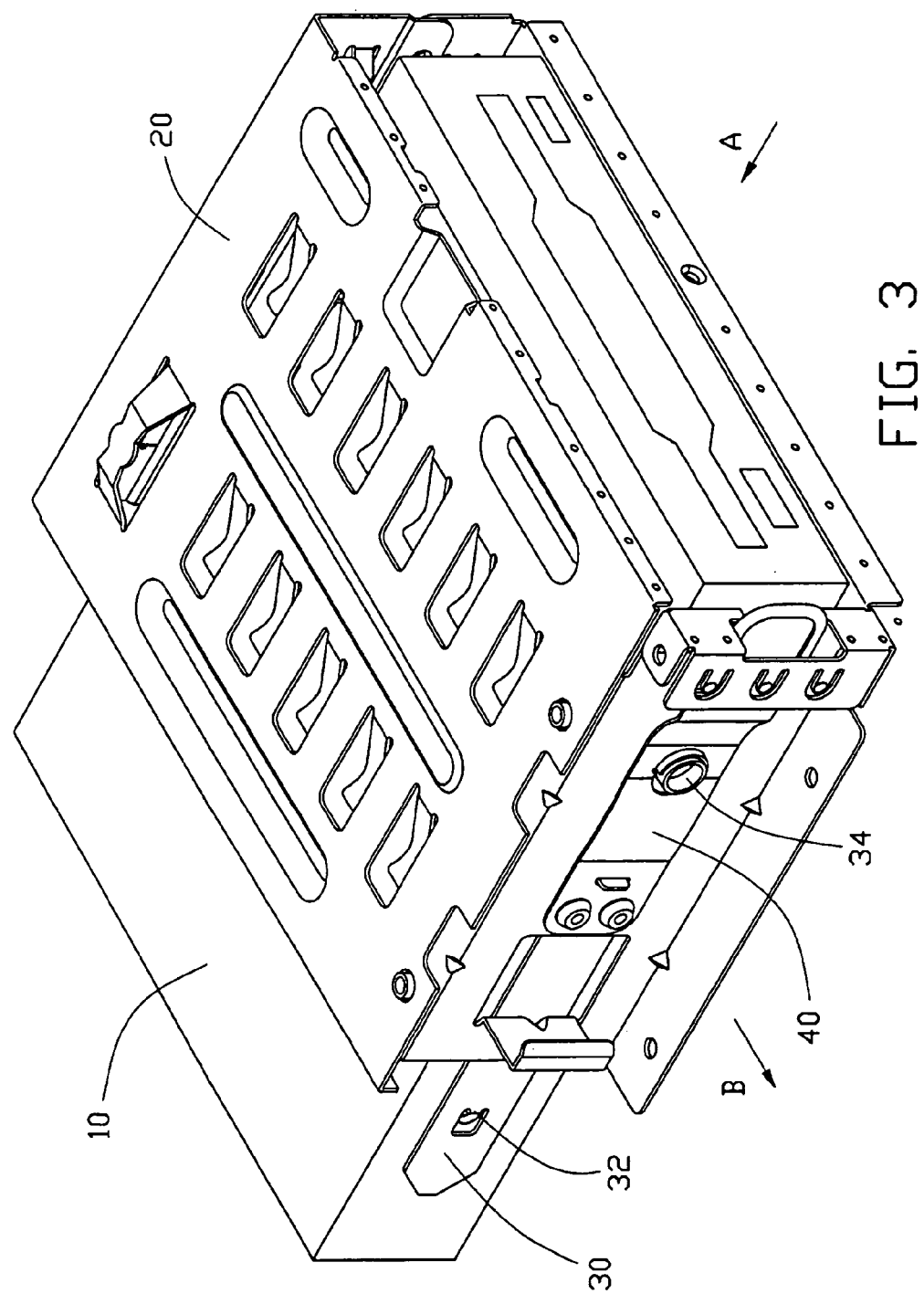
FIG. 3 is an enlarged, assembled view of FIG. 1.

Referring also to FIGS. 2 and 3, in assembly, the mounting posts 230 of the first sidewall 23 are received in the mounting holes 420 of the fixing plate 40, respectively. The first member 42 of the fixing plate 40 is riveted to the first sidewall 23 of the bracket 20 via rivets (not shown). The receiving groove 234 of the first sidewall 23 and the locking hole 424 of the fixing plate 40 partly overlap, a receiving hole 400 is thereby defined. The mounting pins 32 of the rail 30 are received in the holes 12 of the data storage device 10 respectively, so that the rail 30 is mounted to the data storage device 10. The data storage device 10 together with the rail 30 is inserted into the receiving space 21 of the bracket 20 along an arrow "A". When the locking post 34 of the rail 30 abuts against a back end of the receiving groove 234 of the first sidewall 23, the locking post 34 of the rail 30 is received in the receiving hole 400. Thus, the data storage device 10, the rail 30, the bracket 20 and the fixing plate 40 are assembled together. The locking post 34 of the rail 30 and the resilient tabs 240, 250 of the bracket 20 cooperatively retain stably and securely the data storage device 10 in the receiving space 21 of the bracket 20.

In removal of the data storage device 10, the second member 44 of the fixing plate 40 is operated along arrow "B". The locking post 34 of the rail 30 is disengaged from the receiving hole 400. The data storage device 10 is removed from the receiving space 21 of the bracket 20 along a direction that is opposite to the arrow "A".

The mounting posts 230 of the bracket 20 can also be interferentially received in the mounting holes 420 of the fixing plate 40, so that the fixing plate 40 is mounted to the bracket 20. The locking post 34 of the rail 30 can also be directly received in the locking hole 424 of the fixing plate 40.

Figure 4:
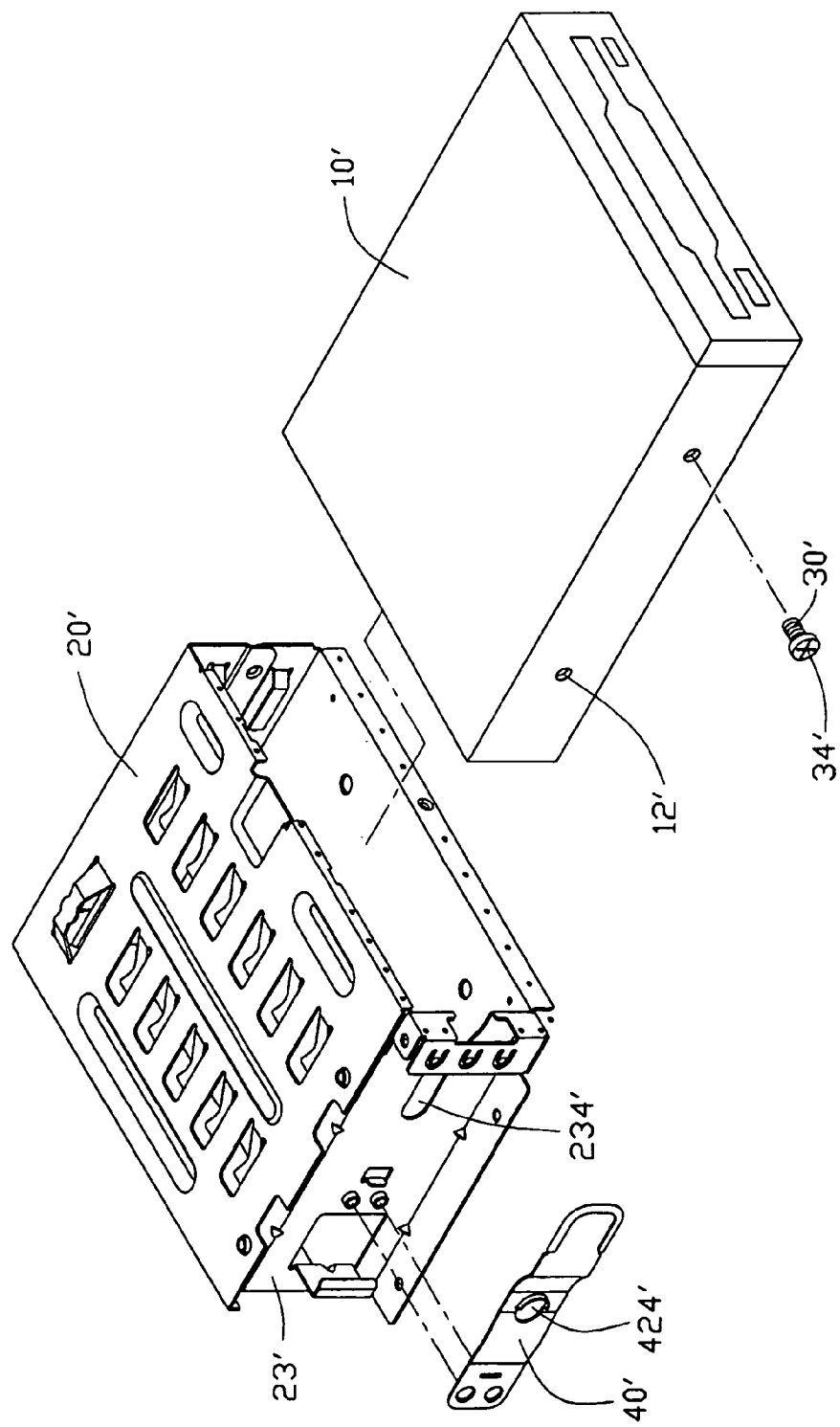
FIG. 4 is an exploded, isometric view of a fastening device in accordance with an alternative embodiment of the present invention, together with a data storage device.
Figure 5:
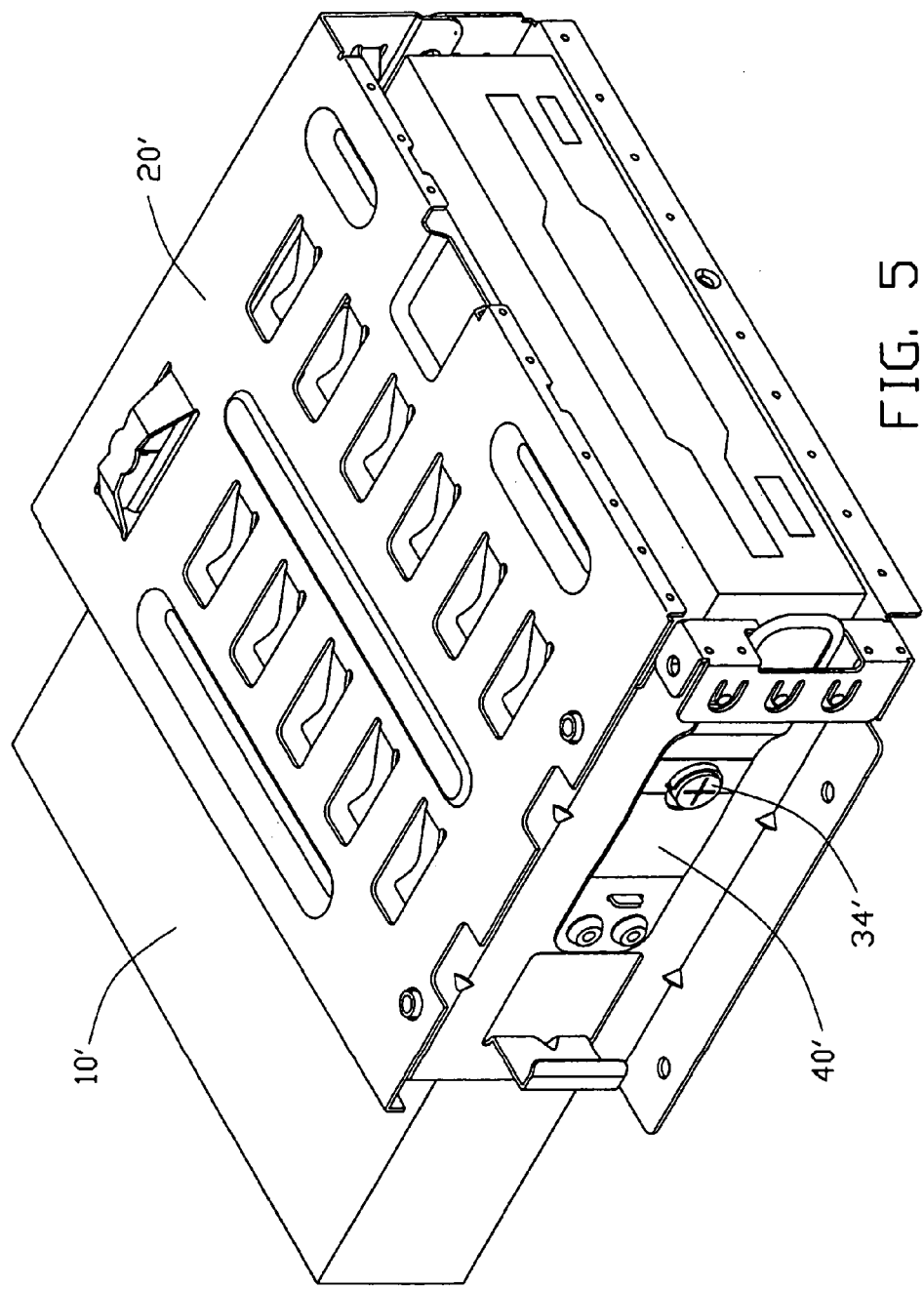
FIG. 5 is an enlarged, assembled view of FIG. 4.
Figure 6:
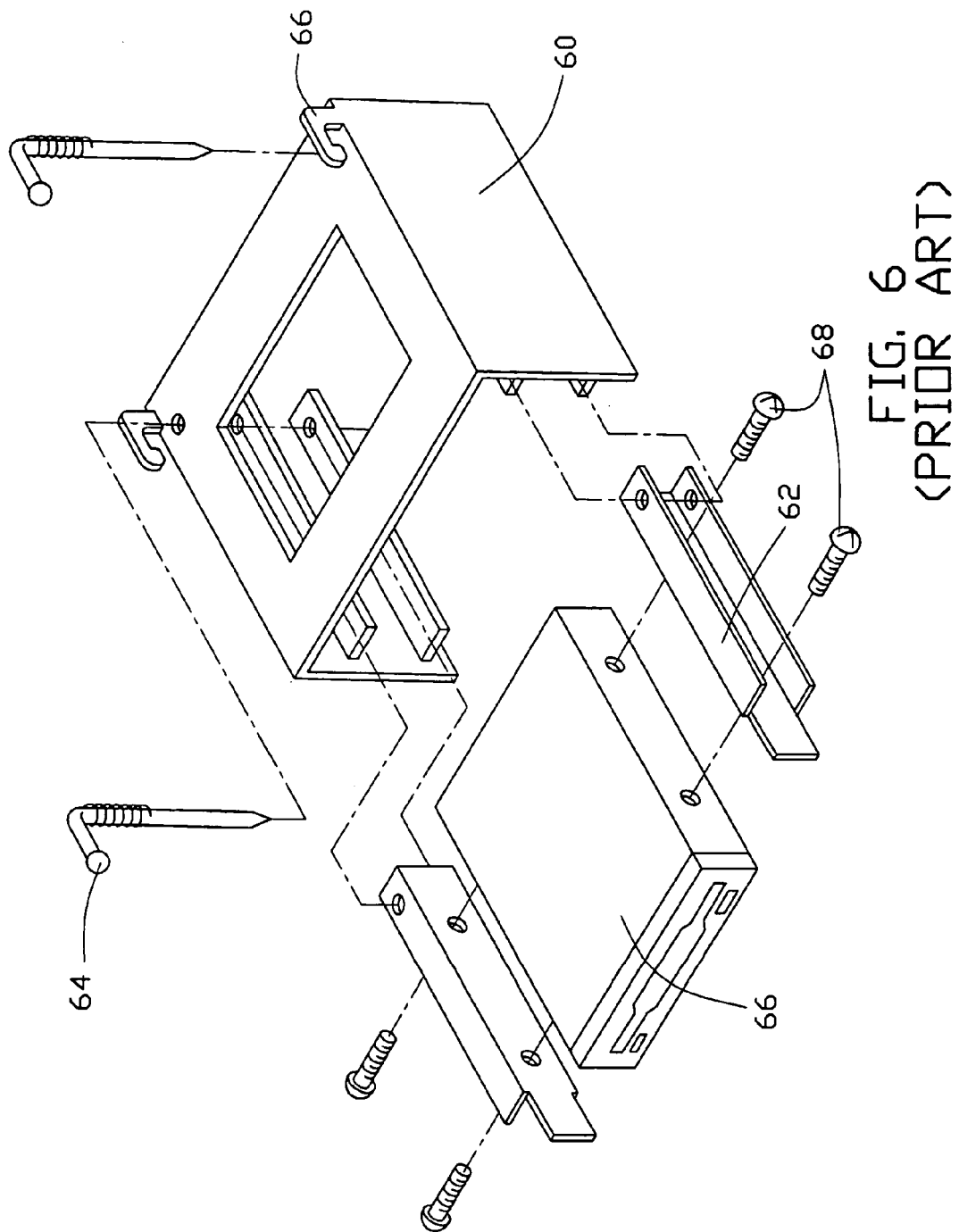
FIG. 6 is an exploded, isometric view of a conventional fastening device, together with a data storage device.

Referring to FIGS. 4 and 5, a fastening device in accordance with an alternative embodiment of the present invention comprises a bracket 20', a screw 30' and a fixing plate 40'. The screw 30' is mounted to a hole 12' of a data storage device 10'. The bracket 20' comprises a first sidewall 23'. The first sidewall 23' defines a receiving hole 234' in a front thereof. The fixing plate 40' defines a locking hole 424' corresponding to the receiving hole 234' of the first sidewall 23'. The screw 30' has a screw post 34', the screw post 34' is received in the hole that the receiving groove 234' of the first sidewall 23' and the locking hole 424' of the fixing plate 40' cooperatively define. The fastening device of the alternative embodiment can perform substantially the same functions as the fastening device of the preferred embodiment.

While preferred embodiments in accordance with the present invention have been shown and described, equivalent modifications and changes known to persons skilled in the art according to the spirit of the present invention are considered within the scope of the present invention as defined in the appended claims.

What is claimed is:

1. A fastening device for securing a data storage device having opposite sides, the fastening device comprising:
   a locking member mounted to one of the sides of the data storage device, the locking member comprising a post;
   a bracket for installing the data storage device therein, the bracket comprising a first sidewall, a second sidewall opposite to the first sidewall, and a top wall, the first sidewall defining a receiving groove in an end thereof, the post of the locking member extendable through the receiving groove; and
   a fixing plate, one end of the fixing plate attached to the first sidewall of the bracket, the fixing plate having a locking through hole defined therein in a direction perpendicular to the fixing plate, and in alignment with the receiving groove of the first sidewall; wherein
   when the post of the locking member is engaged in the locking through hole of the fixing plate and blocked by an edge of the locking through hole, the data storage device is assembled in the bracket; when the post of the locking member is disengaged from the locking through hole of the fixing plate, the data storage device is disassembled from the bracket.

2. The fastening device as described in claim 1, wherein the receiving groove of the first sidewall and the locking through hole of the fixing plate cooperatively define a receiving hole for receiving the post of the locking member.

3. The fastening device as described in claim 1, wherein the fixing plate comprises a first member attached to the first sidewall of the bracket and a second member extending from the first member, the first member and the second member are not coplanar, and wherein the first member substantially abuts the first sidewall of the bracket, and the locking through hole is located in the first member.

4. The fastening device as described in claim 3, wherein the first member of the fixing plate defines a pair of mounting holes and a locating slot, the first sidewall of the bracket comprises a pair of mounting posts corresponding to the mounting holes and a locating plate corresponding to the locating slot.

5. The fastening device as described in claim 1, wherein the locking member is a rail, the post is stamped outwardly (tom the rail to form a hollow cylinder.

6. The fastening device as described in claim 5, wherein a pair of mounting pins projects inwardly from the rail.

7. The fastening device as described in claim 1, wherein the locking member is a screw.

8. The fastening device as described in claim 1, wherein the second wall and the top wall of the bracket respectively have a plurality of resilient tabs, the tabs and the post of the locking member cooperatively retain stably the data storage device in the bracket.

9. A fastening device for securing a data storage device having opposite sides, the fastening device comprising:
   a rail mounted to one of the sides of the data storage device, the rail comprising a post protruding from a side thereof;
   a bracket for installing the data storage device therein, the bracket comprising a first sidewall, a second sidewall opposite to the first sidewall, and a top wall, the first sidewall defining a receiving groove In an end thereof, the receiving groove for receiving the post of the rail; and
   a fixing plate cantileveredly attached to the first sidewall of the bracket, the fixing plate defining a locking through hole in a direction perpendicular to the fixing plate corresponding to the receiving groove of the first sidewall; wherein
   the data storage device is movable between a locked position in which the post of the rail engages in the locking through hole of the fixing plate and is restricted by an edge of the locking through hole, and an unlocked position in which the post of the rail is released from the locking through hole of the fixing plate.

10. The fastening device as described in claim 9, wherein the fixing plate comprises a first member attached to the first sidewall of the bracket and a second member extending from the first member, the first member and the second member are not coplanar.

11. The fastening device as described in claim 10, wherein the locking through hole is located in the first member.

12. The fastening device as described in claim 10, wherein the first member of the fixing plate comprises a pair of mounting holes and a locating slot, the first sidewall of the bracket comprises a pair of mounting posts corresponding to the mounting holes and a locating plate corresponding to the locating slot.

13. The fastening device as described in claim 9, wherein a pair of mounting pins projects from the other side of the rail.

14. The fastening device as described in claim 9, wherein the second wall and the top wall respectively have a plurality of resilient tabs, the tabs and the post of the locking member retain stably the data storage device in the bracket.

* * * * *